Patented Aug. 30, 1938

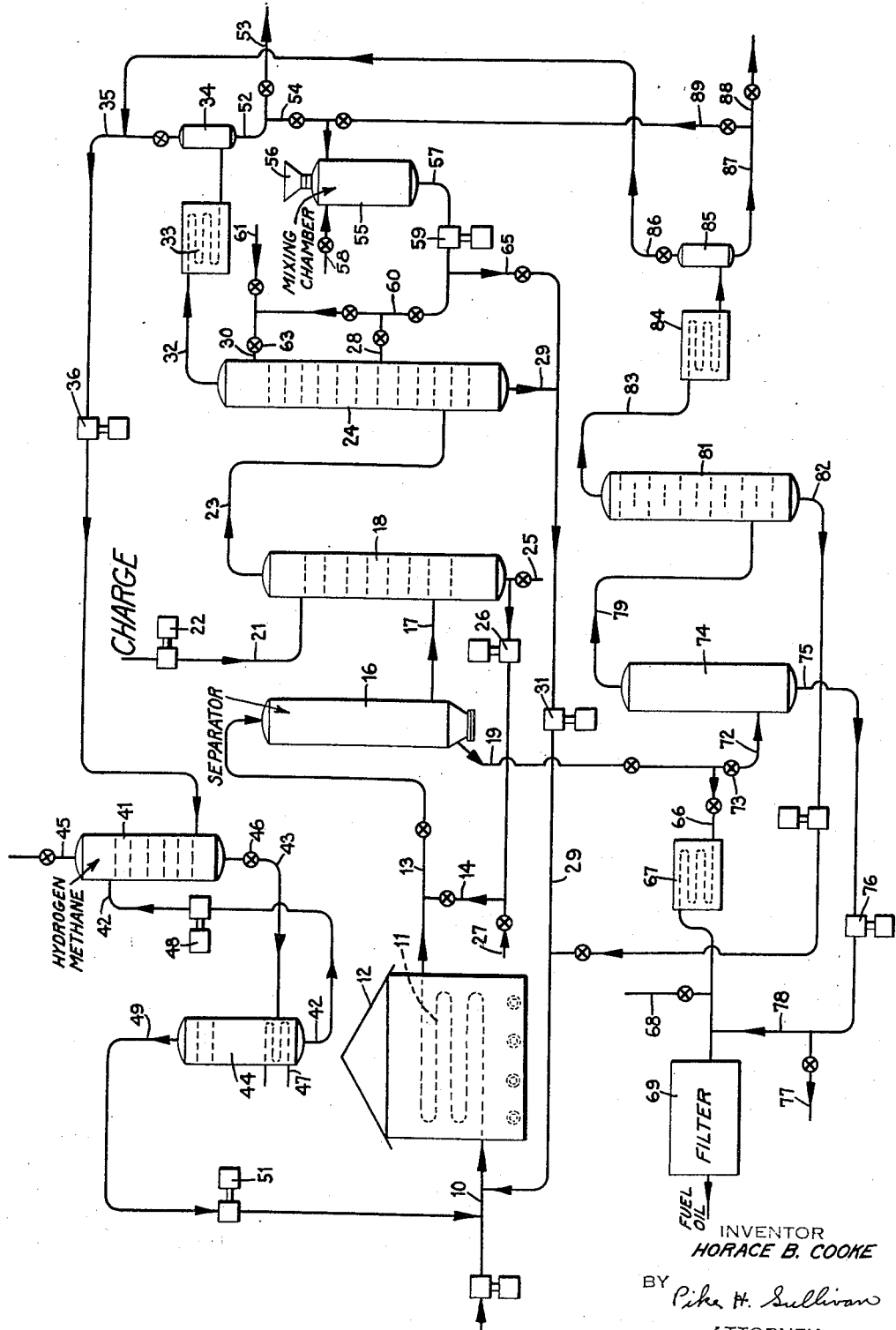

2,128,220

UNITED STATES PATENT OFFICE 2,128,220

GAS CONVERSION

Horace B. Cooke, Clarendon, Va., assignor to Process Management Company, Inc., New York, N. Y., a corporation of Delaware Application April 16, 1936, Serial No. 74,621

4 Claims. (Cl. 196—9)

This invention relates to the treatment of petroleum oil to produce motor fuel and pertains more particularly to a method of completely processing crude petroleum, topped crude or the like to produce a high yield of gasoline of improved quality.

My invention has for its principal object the provision of a process for treating petroleum oil to produce therefrom a maximum yield of motor fuel of high anti-knock characteristics in a simple and more facile manner.

Another object of my invention is to provide an improved method of cracking hydrocarbon oil and polymerizing hydrocarbon gases into motor fuel constituents.

A further and more detailed object of my invention is to provide an improved method of removing impurities, such as sulphur and objectionable unsaturates from the gasoline formed in the process.

A further object of my invention is to provide an improved method of polymerizing gaseous hydrocarbons into higher boiling motor fuel constituents.

Various other objects and advantages of my invention will become apparent from the more detailed description hereinafter.

My invention resides in the steps, combination of steps and sequence thereof hereinafter described.

For a more complete understanding of my invention reference will now be made to the accompanying drawing which is a diagrammatic illustration of an apparatus suitable for carrying my invention into effect.

Referring to the drawing, the reference character 10 designates a charging line through which hydrocarbon oil to be cracked, admixed with solid adsorbent material such as various types of clay to form a slurry and normally gaseous hydrocarbons containing two or more carbon atoms is charged to a heating coil 11 located in furnace 12 wherein the admixture of gases and oil is subjected to cracking and polymerization conditions in the presence of the adsorbent material to convert the oil into lower-boiling hydrocarbons suitable for motor fuel and to effect polymerization or reversion of the gaseous constituents of the charge into higher-boiling constituents within the motor-fuel range. The products from the heating coil 11 pass through transfer line 13, wherein they may merge with a relatively cooler stock of the character hereinafter described introduced through line 14 and the combined mixture passed to a separating and reaction chamber 16 wherein separation of the clay and higher-boiling liquid residue from the conversion operation is separated from vapors. The vapors from separating chamber 16 pass through line 17 into a fractionating tower 18. The clay admixed with the liquid residue separated in chamber 16 is withdrawn therefrom through line 19 and may be cooled or withdrawn from the system or subjected to further treatment as hereinafter described. Vapors introduced into the fractionating tower 18 through line 17 pass upwardly therethrough and are subjected to fractionation therein, preferably in countercurrent contact with fresh charging oil, such as crude, reduced crude or the like introduced through line 21 into the top of the tower 18 by means of charging pump 22. The fresh charging oil, upon being introduced into the fractionating tower in contact with the hot vapors from the reaction chamber 16, is subjected to distillation to remove lower-boiling components therefrom which commingle with the cracked vapor products passing upwardly through the tower 18.

Vapors remaining uncondensed in the tower 18 pass upwardly through line 23 to a separate fractionating tower 24 wherein they are subjected to further fractionation and purification.

Condensate formed in the tower 18 plus unvaporized constituents of the fresh oil charged therein is withdrawn from the bottom of the tower through line 25 and is passed by means of pump 26 and line 14 to the transfer line 13 and employed as a cooling and quenching medium therein. This heavy condensate plus the unvaporized fresh oil, upon coming in contact with the hot products from the heating coil 11, are subjected to high temperature cracking during their passage through the transfer line 13 and reaction chamber 16. If desired, an additional quenching medium of the same or different characteristics may be introduced into the system through line 27 and merged with the products from the heating coil through line 14.

Vapors introduced into the second fractionating tower 24 pass upwardly therethrough in countercurrent contact with the downward flow of solid adsorbent material in suspension in an oil medium introduced into the tower either through lines 28 or 30, or both, and are subjected to purification for removing color-imparting, gum-forming and sulphur-containing compounds therein. This solid adsorbent material may comprise fullers' earth and various types of clay capable of polymerizing objectionable unsaturates which tend to impart color and form gum.

Moreover, this solid adsorbent material under the high temperature existing in the bottom of the fractionating tower 24 will effect removal of sulphur from the vapors contained therein. The temperature and pressure of this tower is preferably regulated to condense higher-boiling constituents above a motor fuel range and to take off as vapors therefrom a motor fuel of desired end point. The solid adsorbent material in suspension within the condensate formed within the fractionating tower 24 and the unvaporized constituents of the medium in which it is suspended prior to its introduction into the fractionating tower 24 are withdrawn from the bottom thereof through line 29 provided with pump 31 and are forced through line 13 where they are recycled to heating coil 11 for conversion therein.

Vapors remaining uncondensed in the fractionating and purifying tower 24 pass overhead through line 32 to a condenser 33 wherein the desired motor-fuel distillate is condensed and from whence it passes to a separating drum 34 wherein the liquid distillate separates from fixed gases formed in the process. Fixed gases separated in separating drum 34 pass overhead through line 35 provided with a pump 36 to a hydrogen and methane separator 41 wherein the gases are fractionated to separate hydrogen and methane therefrom. To this end the gases are introduced into the bottom of separator 41 wherein they pass upwardly countercurrent to the downward flow of an adsorbent oil, such as gas oil, capable of selectively adsorbing hydrocarbons containing two or more carbon atoms. The enriched adsorbent oil collected in the bottom of tower 41 is withdrawn through line 43 to a distilling chamber 44 wherein the adsorbent oil is distilled to vaporize the low-boiling gaseous hydrocarbons therefrom. Hydrogen and methane liberated from the remainder of the gases in the fractionating tower 41 are withdrawn from the top thereof through line 45 and are rejected from the system or subjected to further treatment as desired. The distillation of the enriched adsorbent oil introduced into the tower 44 may be effected by reducing the pressure thereon by means of reducing valve 46 located in the line 43 or by supplying additional heat such as by an indirect heating coil 47 located in the bottom of the tower. The adsorbent oil stripped of its lighter constituents in the distilling chamber 44 is withdrawn from the bottom thereof through line 42 and re-introduced into the top of the adsorbing tower 41 by means of pump 48.

The hydrocarbon gases formed in the process and liberated of hydrogen and methane in the adsorbing tower 41 pass overhead from the distilling chamber 44 through line 49 and are forced by means of pump 51 to the charging line 10 from which they pass through the cracking coil 11 and are subjected to polymerization conditions in the presence of the heavier hydrocarbon oil and solid adsorbent material introduced through line 31.

Distillate separated in the separating chamber 34 is withdrawn therefrom through line 52 and is passed to suitable storage tanks through line 53. A portion of this distillate may, if desired, be introduced through line 54 into a mixing chamber 55 wherein it is used as a medium for the solid adsorbent material introduced into the chamber 55 through the hopper 56 located in the top thereof. Other oils, such as gas oil, kerosene, or light gas oil may be introduced into the mixing chamber 55 through line 58 as a suspension agent for the solid adsorbent material. As hereinbefore pointed out, the solid adsorbent material introduced into the mixing chamber 55 may be any solid material capable of selectively adsorbing or polymerizing objectionable constituents present in the hydrocarbon vapors. Such material may include fullers' earth and various types of clays either natural or acid-treated. The mixing chamber 55 is preferably provided with suitable agitating means, such as mechanical agitators, (not shown) for effecting the suspension of the clay within the oil.

The clay and oil suspension is withdrawn from the bottom of the mixing chamber 55 and is forced by means of pump 59 and line 60 to branch lines 28 or 30, or both, through which it is introduced into the fractionating and purifying tower 24. When employing a heavier oil than the final distillate from the process as a suspension medium for the clay or other adsorbent material the slurry of clay and oil is preferably introduced into the fractionating tower at an intermediate point such as through line 28. In such an event an additional refluxing medium may be introduced into the top of the tower through lines 61 and 30.

In lieu of introducing the clay or other adsorbent material and oil slurry into the purifying and fractionating tower 24 a portion or all of the slurry may be passed through line 57, pump 59 and line 65 and merged with condensate withdrawn from the bottom of the fractionating tower 24.

The liquid residue and spent clay separated in the reaction and separating tower 16 is withdrawn therefrom through line 19 as hereinbefore described and may be passed through lines 19, 66, cooler 67 and line 68 to suitable storage (not shown) or the mixture may be passed to a filter 69 for separating the clay from the liquid residue and the liquid residue withdrawn from the system.

However, the mixture of clay and liquid residue withdrawn from the reaction chamber 16 may contain substantial quantities of lower-boiling constituents, particularly when the reaction chamber is maintained under relatively high pressure, and in this event the products withdrawn from the bottom of reaction chamber 16 through line 19 may be passed through line 72 forming a continuation thereof, provided with a reducing valve 73 into a reduced pressure distilling chamber 74 wherein it is subjected to additional distillation under reduced pressure or by the supplying of additional heat to vaporize lower-boiling constituents therefrom. Residue and clay remaining unvaporized in the distilling chamber 74 are withdrawn therefrom through line 75 provided with pump 76 and may be withdrawn from the system through line 77 or passed through line 78 to the filter pump 69 for separation of clay and the final liquid products. When operating in this manner the final residue containing the clay may be passed to a de-asphaltizing apparatus and the mixture of asphalt and clay marketed as a binding material having properties comparable with Trinidad asphalt.

Vapors liberated in the reduced pressure distilling chamber 74 pass overhead through line 79 to a fractionating tower 81 wherein they are subjected to fractionation to condense higher-boiling constituents boiling above the motor fuel range. Condensate formed in the tower 81 is withdrawn from the bottom thereof through line 82 which merges with line 29 through which it passes to the charging line 10 for further treatment in the heating coil 11. Vapors remaining uncondensed in the fractionating tower 81 pass overhead through line 83 to a condenser 84 wherein the motor fuel distillate condenses and from whence it passes to a receiving drum 85 wherein the distillate separates from fixed gas. The fixed gas passes overhead from receiving drum 85 through line 86 which merges with line 35 and is subjected to further treatment with the gases withdrawn from the receiving drum 34 as hereinbefore described. Distillate separated in the receiving drum 85 is withdrawn therefrom through line 87 and may be passed to suitable storage tanks (not shown) through line 88 or it may pass through line 89 into the mixing chamber 55 to serve as a suspension medium for the clay or other adsorbent material introduced therein.

The following example will serve as a guide in carrying out my invention to obtain the greatest benefits thereof, it being understood that the conditions specified hereinafter are illustrative rather than limitative.

The combined stream of refinery gases and oil admixed with clay or other adsorbent material during its passage through coil 11 may be subjected to a temperature ranging from 900° to 1200° F. and may thereafter be cooled to a temperature of from 850° to 950° F. prior to its introduction into the combined reaction and separating chamber 16 by the relatively cooler oil introduced into the transfer line through line 14. The time of treatment may vary depending upon the temperature and may be regulated, for example, to effect from 20 to 40 or more per cent conversion of the oil into gasoline during its passage through the heating coil and reaction chamber.

The temperature in the primary fractionating tower 18 into which the fresh crude or reduced crude is charged may range from 650° to 700° F. at the top and from 750° to 800° F. at the bottom. The temperature of the secondary fractionating and purifying tower 24 may range from 650° to 700° at the bottom and from 400° to 500° at the top depending upon the pressure maintained therein. As hereinbefore pointed out, the top temperature of this tower is preferably regulated to take overhead distillate of the desired end point.

The pressure maintained in the heating coil 11, reaction chamber 16, primary fractionating tower 18 and secondary fractionating tower 24 may be substantially uniform except for the necessary pressure drop to effect the desired flow or a differential pressure may be maintained between the heating coil 11 and the reaction chamber 16 or between the reaction chamber 16 and the subsequent fractionating tower. The pressure in the heating coil 11 is preferably a relatively high pressure such as in excess of 400 pounds per square inch, preferably ranging from 700 to 1000 or more pounds per square inch. The pressure in the primary fractionating tower 18 and the secondary fractionating and purifying tower 24 may range, for example, between 200 and 400 pounds per square inch. The pressure in the reduced pressure distilling chamber 74 and the fractionating tower 81 connected therewith is of materially lower pressure than the pressure existing in the reaction chamber 16 and may range from atmospheric to 200 to 300 pounds per square inch.

The hydrogen- and methane-separating chamber 41 is preferably maintained under relatively high pressure such as from 400 to 600 pounds per square inch and the distilling chamber 44 communicating therewith may be at somewhat lower pressure such as from atmospheric to from 100 to 200 pounds per square inch.

Having described the steps, combination of steps and sequence thereof constituting my invention, it will be understood that it embraces such other modifications and variations as fall within the spirit and scope thereof and that it is not my intention to dedicate any novel features or to unnecessarily limit the invention.

I claim:

1. A process for converting hydrocarbons which comprises subjecting hydrocarbon oil to elevated conditions of temperature and pressure to effect cracking thereof, separating the products of cracking into vaporous and liquid constituents, passing vaporous constituents thus obtained through a primary fractionating zone and a secondary fractionating zone, contacting said vapors in the primary fractionating zone with fresh charging oil, passing vapors uncondensed in said first fractionating zone in countercurrent contact with a slurry comprising liquid hydrocarbons and clay capable of polymerizing unsaturated constituents contained in said vapors in said second fractionating zone, passing condensate formed in said second fractionating zone in admixture with said clay to said cracking zone for further treatment therein, condensing vapors from said fractionating zone to form a final distillate product, separating said distillate product from normally gaseous hydrocarbons resulting from the cracking treatment, removing hydrogen and methane from said normally gaseous hydrocarbons, and returning gases remaining after the removal of said hydrogen and methane to said cracking zone for further treatment therein.

2. A process in accordance with claim 1 wherein condensate and unvaporized fresh charging oil from said primary fractionating zone are contacted with the cracked products prior to separation thereof.

3. A process in accordance with claim 1 wherein clay is separated with the liquid constituents from the products of the cracking operation, the material thus separated being subjected to distillation to thereby vaporize hydrocarbons therefrom, condensing vapors thus obtained, and returning thus formed condensate to the cracking zone for further treatment.

4. A process in accordance with claim 1 wherein said liquid hydrocarbons mixed with said clay to form the slurry constitute a hydrocarbon oil substantially completely vaporizable under the conditions maintained in said second fractionating zone.

HORACE B. COOKE.